(12) United States Patent
Hendriks et al.

(10) Patent No.: US 7,440,075 B2
(45) Date of Patent: Oct. 21, 2008

(54) BIREFRINGENT OPTICAL SYSTEM

(75) Inventors: Bernardus Hendrikus Wilhelmus Hendriks, Eindhoven (NL); Coen Theodorus Hubertus Fransiscus Liedenbaum, Eindhoven (NL); Sjoerd Stallinga, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/599,068

(22) PCT Filed: Mar. 14, 2005

(86) PCT No.: PCT/IB2005/050890

§ 371 (c)(1),
(2), (4) Date: Sep. 19, 2006

(87) PCT Pub. No.: WO2005/093489

PCT Pub. Date: Oct. 6, 2005

(65) Prior Publication Data

US 2007/0273943 A1    Nov. 29, 2007

(30) Foreign Application Priority Data

Mar. 24, 2004   (EP)   ................... 04101205

(51) Int. Cl.
*G02B 27/12* (2006.01)
(52) U.S. Cl. .............. 349/193; 349/15; 349/200; 359/495; 359/497; 359/665

(58) Field of Classification Search .......... 349/200, 349/15, 193; 35/495, 497, 665
See application file for complete search history.

(56) References Cited

FOREIGN PATENT DOCUMENTS

| DE | 19959203 A1 | 6/2001 |
|---|---|---|
| NL | WO 03/071335 A2 * | 8/2003 |
| WO | WO03071335 A | 8/2003 |
| WO | WO2004027490 A | 4/2004 |
| WO | WO2004027490 A1 | 4/2004 |
| WO | WO2005093489 A3 | 10/2005 |

OTHER PUBLICATIONS

"DVD Pick-Up System Reads Two Layers Simultaneously"; Optics and Lasers Europe, Sep. 2000.

* cited by examiner

*Primary Examiner*—Frank G Font
*Assistant Examiner*—Michael P Mooney
(74) *Attorney, Agent, or Firm*—Michael E. Belk

(57) ABSTRACT

The invention relates to an optical system comprising a fluid chamber 1 and a birefringent part. The fluid chamber comprises first and second fluids 10, 12 having different indices of refraction, the interface between the fluids forming a meniscus 14. The birefringent part is capable of varying characteristics of a first radiation beam 3b and a second radiation beam 3c, the first and second radiation beams having different polarisations. Variation in the configuration of the meniscus causes variation in the characteristics of the first radiation beam and the second radiation beam. Variation in the configuration of the meniscus may be controlled by electrowetting.

8 Claims, 10 Drawing Sheets

BIREFRINGENT OPTICAL SYSTEM

FIELD OF THE INVENTION

This invention relates to optical systems incorporating birefringent components. Specifically, the invention relates to birefringent components for use in optical systems such as optical scanning devices for optical data media, polarizing beam splitters, and microscopes.

BACKGROUND OF THE INVENTION

Birefringent materials are widely used in applied optics. Birefringent materials display two different indices of refraction, due to optical anisotropy. An optically anisotropic material is one in which the optical properties are not the same in all directions. Due to this anisotropy, a radiation beam directed into a birefringent medium will be split into two beams of differing angles of refraction. A radiation beam made up of two parts in differing polarisation states incident on a birefringent material will be divided; one part of the beam is refracted according to the ordinary refractive index while the second part of the beam is refracted according to the extra-ordinary refractive index.

A Wollaston prism is an example of an optical device that employs birefringent materials. A Wollaston prism is a polarizing beam splitting prism that comprises a non-birefringent part and birefringent part. A radiation beam shone through the prism is separated into two, orthogonally polarized rays at the interface between the parts. Wollaston prisms are used in microscopes, such as the Nomarski microscope, in which the orthogonally polarized rays are used to scan two different areas of a three-dimensional sample. The characteristics of a Wollaston prism are not variable, however.

It is often desirable to alter the characteristics of a lens in order to alter the direction and angle of output rays, e.g. for the purposes of focusing on a microscope sample. Liquid crystal lenses have been used in optical scanning devices for the purpose of scanning multi-layer optical storage media ('DVD pick-up system reads two layers simultaneously'—Optics and Lasers Europe, September 2000). Liquid crystals consist of elongate molecules that are capable of flowing freely, but are also capable of interacting to form and sustain large scale order, in the manner of a crystal. Nematic liquid crystals consist of molecules that tend to lie substantially parallel. When the molecules are oriented such that they are substantially parallel, the liquid crystal is optically anisotropic, and is therefore birefringent. The direction of the parallel orientation of the liquid crystals can be controlled by providing an alignment layer which orients the molecules, and by applying a voltage. When a voltage is applied, the molecules will rotate into alignment with the field.

Controlling the properties of liquid crystal lenses for optical purposes by altering the nematic orientation of the constituent molecules by applying a voltage is not always ideal, as the crystals take some time to align in response to the voltage. The time taken to align may be too slow for the purposes of, for example, altering the shape of the lens while scanning an optical medium in real time.

SUMMARY OF THE INVENTION

In accordance with one aspect of the present invention, there is provided an optical system comprising a fluid chamber, the fluid chamber comprising a first fluid, wherein the optical system comprises a birefringent part which is capable of varying characteristics of a first radiation beam and a second radiation beam, the first and second radiation beams having different polarisations, characterised in that:

the fluid chamber contains a second fluid, the first and second fluids having different indices of refraction and the interface between the fluids forming a meniscus; and the birefringent part is arranged such that a variation in the configuration of the meniscus causes said variation in the characteristics of the first radiation beam and the second radiation beam.

The present invention provides a birefringent optical element having characteristics that can be rapidly altered by moving the meniscus between the two fluids. The meniscus between the fluids can be moved almost instantaneously, with a high degree of accuracy. An embodiment of the present invention therefore provides an optical element which is suitable for, inter alia, rapid, adaptive scanning of optical media, and accurate, high-speed focusing on microscopic samples.

A fluid is a substance that alters its shape in response to a force, and will tend to conform to the shape of its container. Fluids include liquids, gases, and mixtures of solids and liquids, and solids and gases that are capable of flow.

The configuration of the meniscus includes its size, shape, position in the chamber relative to the fluids and degree of curvature (e.g. whether convex or concave). Variation in the configuration of the meniscus may include a change in one or all of these characteristics.

In a preferred embodiment, the fluid chamber comprises a first electrode separated from the fluids by a fluid contact layer, and a contact electrode in conductive communication with one of the fluids. In this embodiment, the fluid contact layer has a wettability by one of the fluids that varies according to a voltage between the electrodes, such that the configuration of the meniscus varies in dependence on said voltage. The configuration of the meniscus can therefore be rapidly and accurately controlled by controlling the voltage applied by the electrodes.

In one arrangement, the first fluid comprises the birefringent part. In this arrangement, the first fluid may comprise liquid crystal molecules, and the fluid chamber comprises an alignment layer, the alignment layer being operable to align the liquid crystal molecules. The alignment layer may be arranged in the fluid chamber opposite the meniscus, in order to control the birefringent properties of the liquid crystal molecules, by controlling the nematic orientation of the long axis of the liquid crystal molecules. By placing the alignment layer opposite the meniscus, the alignment layer is operable to align the molecules relative to the plane of an input radiation beam, so that the beam is refracted.

Where the first fluid comprises the birefringent part, and the fluid chamber is arranged to produce a plurality of different meniscus configurations, the meniscus may form a substantially planar interface between the first and second fluids. A planar meniscus will present a constant angle of refraction to an incoming radiation beam, irrespective of the point on the meniscus on which the beam is incident. An optical system according to an embodiment of the present invention thereby provides a Wollaston prism having variable characteristics, with the added advantages of rapid and highly accurate tuneability. Alternatively, the meniscus may form a curved interface between the first and second fluids. In particular, the optical system may be in the form of a tuneable, birefringent lens. In an embodiment, an optical system according to the present invention may be used for scanning different layers of an optical data storage medium. The meniscus may be curved in one or two axes.

The effect of the alignment layer on the orientation of the liquid crystal molecules is proportional to the proximity of each molecule to the layer. Consequently, molecules further away from the alignment layer are less likely to be appropriately aligned, leading to heterogeneity in the optical properties of the liquid crystal as a whole. Therefore, where a thick birefringent layer is required, or where the refractive properties of a birefringent fluid are insufficient or inappropriate, the birefringent part is formed from a solid material. A solid birefringent part may also be appropriate in applications where the optical system is arranged to provide a high interface angle or a large curvature between one or more components of the system within the fluid chamber.

Where the birefringent part is formed from a solid material, and the birefringent part has a refractive surface which is substantially planar, and the fluid chamber is arranged to produce a plurality of different meniscus configurations, the meniscus may form a substantially planar interface between the first and second fluids. Alternatively, where the birefringent part has a refractive surface which is curved, the meniscus may form a curved interface between the first and second fluids. The advantages of a meniscus for rapid, accurate refraction of a beam are therefore provided in combination with the optical properties of solid birefringent materials.

An embodiment of the present invention takes the form of optical scanning device for scanning an optical record carrier, comprising an optical system as described above. In this embodiment, the meniscus is configurable to correct for variations arising during the scanning of different information data storage layers depths in the optical record carrier. Optical data storage media are subject to manufacturing errors that may lead to variation in the relative depth of the information storage layers, and the scanning process may also be subject to optical aberrations. A typical manufacturing variation in the depth of the data storage layers in a DVD (Digital Versatile Disc) is 5 μm. The present invention can correct for such variations by the rapid adjustment of the configuration of the meniscus in order to correctly focus the scanning beam(s) onto the data storage layers.

Another embodiment of the invention is an optical microscopy device comprising an optical system as described above. In the optical microscopy device, the optical system is arranged such that the first and second radiation beams are focussed onto a three dimensional sample via an objective lens to produce an output image, wherein the optical system is operable to vary the configuration of the meniscus to vary the contrast of the output image. The present invention allows the contrast to be optimised by tuning of the meniscus configuration, thereby improving the quality of microscopic images. Further features and advantages of the invention will become apparent from the following description of preferred embodiments of the invention, given by way of example only, which is made with reference to the accompanying drawings.

DETAILED DESCRIPTION OF THE INVENTION

Figure 1:
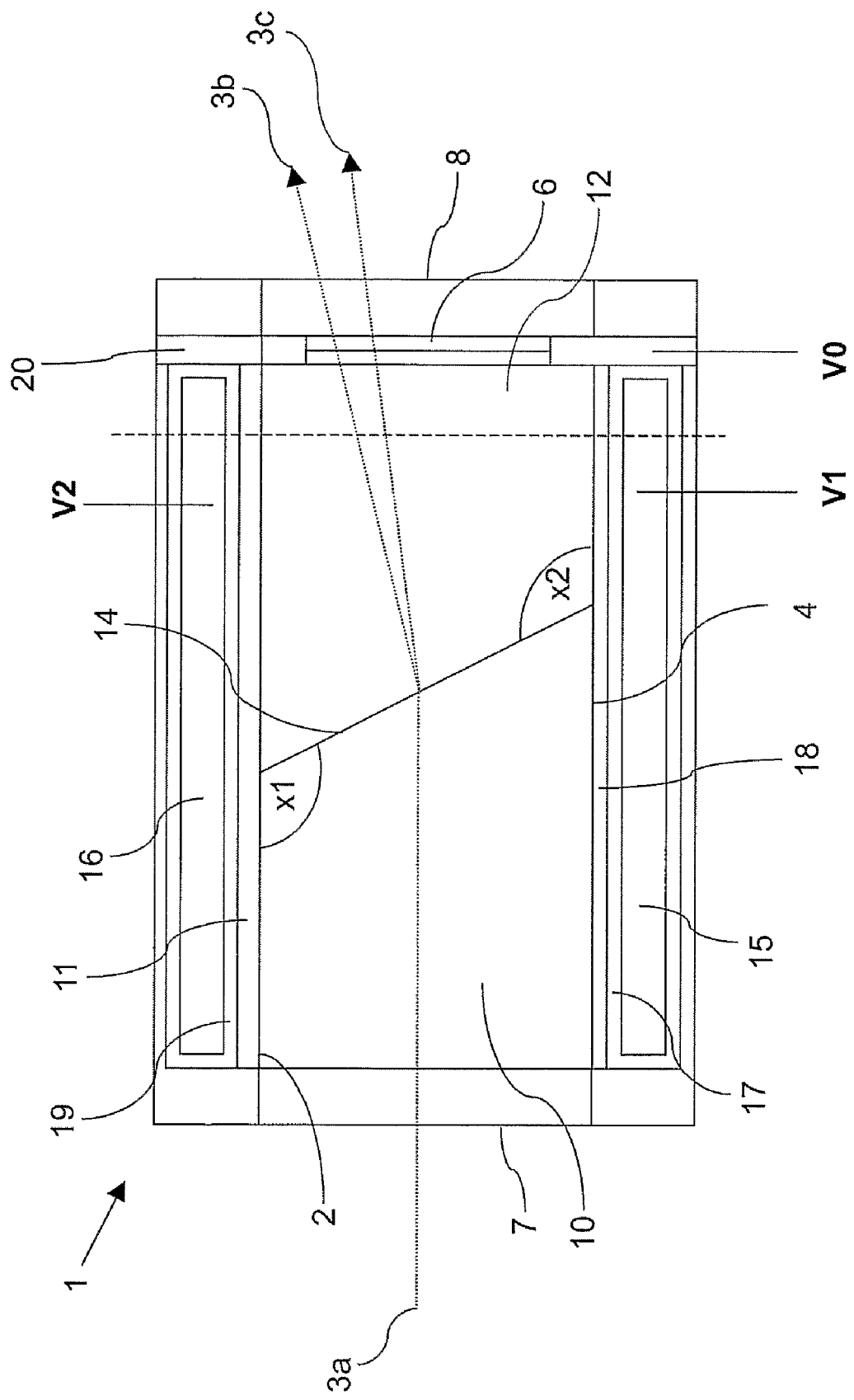
FIG. 1 shows a first embodiment of the present invention in profile section.

FIG. 1 shows an optical system according to a first embodiment of the present invention, in profile section. A fluid chamber 1 comprises four sidewalls, of which two 2, 4 are shown. The fluid chamber 1 further comprises end walls 7, 8 which are transparent, to permit the entry and exit of input and output radiation beams. The fluid chamber 1 encloses first and second fluids 10, 12 which are immiscible and separated by meniscus 14 which is planar. The end wall 8 includes an alignment layer 6 in contact with the second fluid 12. First and second sidewall electrodes 15, 16 are incorporated into sidewalls 2, 4. The first and second sidewall electrodes 15, 16 are separated from first and second fluids 10, 12 by insulating layers 17, 19 and fluid contact layers 18, 11 respectively. Contact electrode 20 is an annular electrode, arranged at one end of the chamber, in direct contact with second fluid 12. Alternatively, the electrode 20 may be capacitively coupled to the second fluid 12. The central portion of contact electrode 20 comprises an aperture such that second fluid 12 is in conductive communication with the alignment layer 6. An input beam, represented by an input ray 3a, enters the fluid chamber, and is refracted to leave the fluid chamber 1 as first and second output radiation beams, represented by output rays 3b, 3c. Contact electrode 20 is operable to produce a voltage V0. First and second sidewall electrodes 15, 16 are operable to produce voltages V1 and V2 respectively.

The first fluid 10 is immiscible with the second fluid 12. In this embodiment, the first fluid 10 is an electrically insulating liquid such as a silicone oil or an alkane. The first and second fluids 10, 12 are preferably arranged to have an equal density, so that the optical system may function in any orientation irrespective of gravity. The density of the first fluid 10 may be arranged to be the same as that of the second fluid 12 by appropriate selection and addition of molecular constituents to the first fluid 10 and/or the second fluid 12.

The second fluid 12 comprises liquid crystal molecules and is birefringent. The liquid crystal molecules are aligned by the alignment layer 6. The alignment layer 6 is a layer of glass coated with a thin layer of indium tin oxide. The surface of the alignment layer 6 which is in contact with second fluid 12 is formed with microgrooves (not shown) stamped or rubbed into the indium tin oxide. The microgrooves act to align the liquid crystal molecules in second fluid 12 by forming a template of parallel ridges. The microgrooves may be oriented in any direction across alignment layer 6, depending on the desired optical properties of second fluid 12.

The microgrooves in alignment layer 6 orient the long axis of the liquid crystal molecules, and thereby define the direction of the birefringent (optic) axis of the system. A radiation ray linearly polarized parallel to the axis of the microgrooves will be refracted according to the extraordinary refractive index as it traverses second fluid 12. By contrast, a ray linearly polarized at 90° to the axis of the microgrooves will be refracted according to the ordinary refractive index.

The first and second electrodes 15, 16 are formed from a metallic material and are coated with insulating layers 17, 19 which are formed from, for example, parylene. The insulating layers have a thickness of between 50 nm and 100 μm. The insulating layers 17, 19 are separated from the first and second fluids 10, 12 by fluid contact layers 11 and 18, which reduce the hysteresis of the contact angles x1, x2 of the meniscus with the sidewalls 2, 4 of the optical system.

The fluid contact layers 11, 18 have a thickness of between 5 nm and 50 μm, and are preferably formed from an amorphous fluorocarbon such as Teflon™ AF1600 produced by DuPont™. The AF1600 coating may be produced by dip coating. The parylene coating forming the insulating layers 17 and 19 may be applied by chemical vapour deposition. It is also possible to use a single layer that serves as the fluid contact layer as well as the insulating layer, for instance an AF1600 layer of several micrometres thick.

First and second fluids 10, 12 are immiscible with respect to each other, and so separate into two fluid bodies separated by the meniscus 14. In the absence of a voltage between the first and second sidewall electrodes 15, 16 and the contact electrode 20, the fluid contact layer 18 has a higher wettability with respect to first fluid 10 than second fluid 12. Due to electrowetting, the wettability of fluid contact layer 18 by second fluid 12 varies according to the application of a voltage by the first and second sidewall electrodes 15, 16 and the contact electrode 20, which changes the contact angles x1, x2 of the meniscus with the three phase line (the line of contact between fluid contact layer 18, first fluid 10 and second fluid 12.) The configuration of the meniscus is thus variable in dependence upon the voltage applied by the electrodes.

Figure 2:
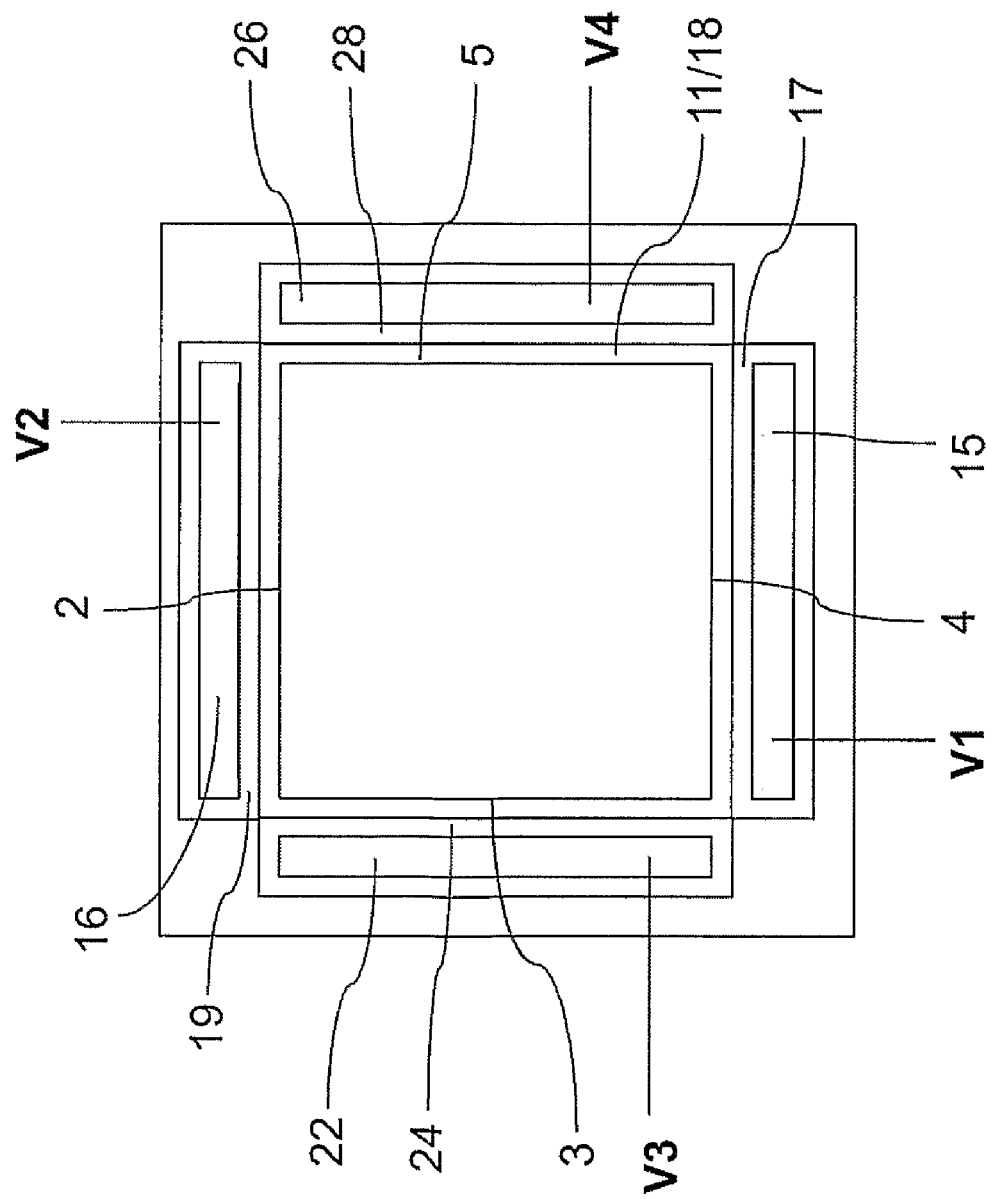
FIG. 2 shows a cross section of the embodiment shown in FIG. 1, taken across the dashed line shown therein.

FIG. 2 shows a cross section of the embodiment shown in FIG. 1, taken across the dashed line shown therein. All of the sidewalls 2, 3, 4, 5 are shown. The sidewalls 2, 3, 4, 5 form a square outline around the optical axis of the fluid chamber 1. The sidewall 3 includes a third sidewall electrode 22, surrounded by an insulating layer 24, while the opposite sidewall 5 includes a fourth sidewall electrode 26, surrounded by insulating layer 28. It can be seen that the fluid contact layer 11, 18 forms a continuous layer around all the sidewalls. Third sidewall electrode 22 is operable to produce a voltage V3, while fourth sidewall electrode 26 is operable to produce a voltage V4. The voltage of each sidewall electrode is controlled separately by means of a voltage control system (not shown). As can be seen with reference to FIG. 1, when a first combination of voltages is applied between the electrodes, the meniscus 14 adopts a first desired meniscus configuration. A combination of voltages V0, V1 and V2 is arranged such that the second fluid 12 has a greater wettability with respect to sidewall 2 than with respect to sidewall 4, forming an angled, planar meniscus. V3 and V4 are controlled to be equal and to produce a 90° meniscus contact angle at their respective sidewalls 3, 5. The contact angles x1, x2 are controlled, by means of voltages V1 and V2, to be equal to ensure that the meniscus is planar. In this first configuration, the contact angles x1, x2 between the meniscus 14 and the fluid contact layer 18, are, for example, approximately 120°.

Figure 3:
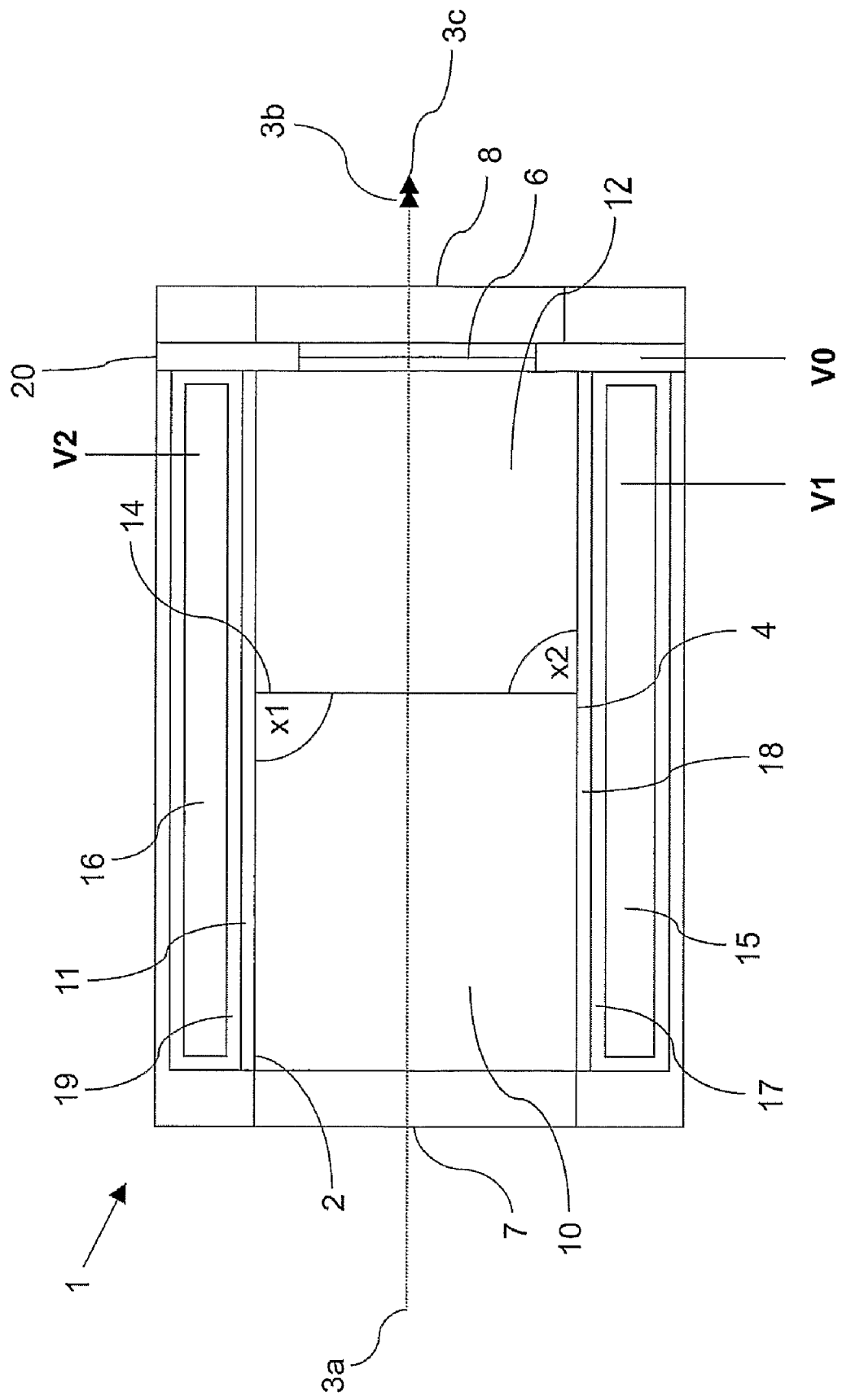
FIG. 3 shows the embodiment of FIG. 1, where the meniscus has been altered to a different desired configuration.

FIG. 3 shows the embodiment of FIG. 1, where the meniscus configuration has been altered to a different desired configuration. A second combination of voltages V0, V1, V2, V3 and V4 is applied between the electrodes, such that the wettability of the second fluid with respect to both sidewalls 2, 4 is the same. In this case, the voltages V3 and V4 are of equal magnitude. The meniscus adopts a meniscus configuration having a decreased angle with respect to the first meniscus configuration. In this second configuration, the contact angles x1, x2 are approximately 90°, such that the input beam, represented by the input ray 3a, hits the meniscus at right angles and no refraction occurs to either of the output beam components represented by the output rays 3b, 3c.

It can be seen that the angle of refraction and the angular separation of the first and second output rays 3b, 3c changes as the configuration of the meniscus is altered. The angle of refraction and angular separation of the first and second output rays 3b, 3c can therefore be very precisely controlled and rapidly altered by means of the voltages applied between the electrodes.

Figure 4A:
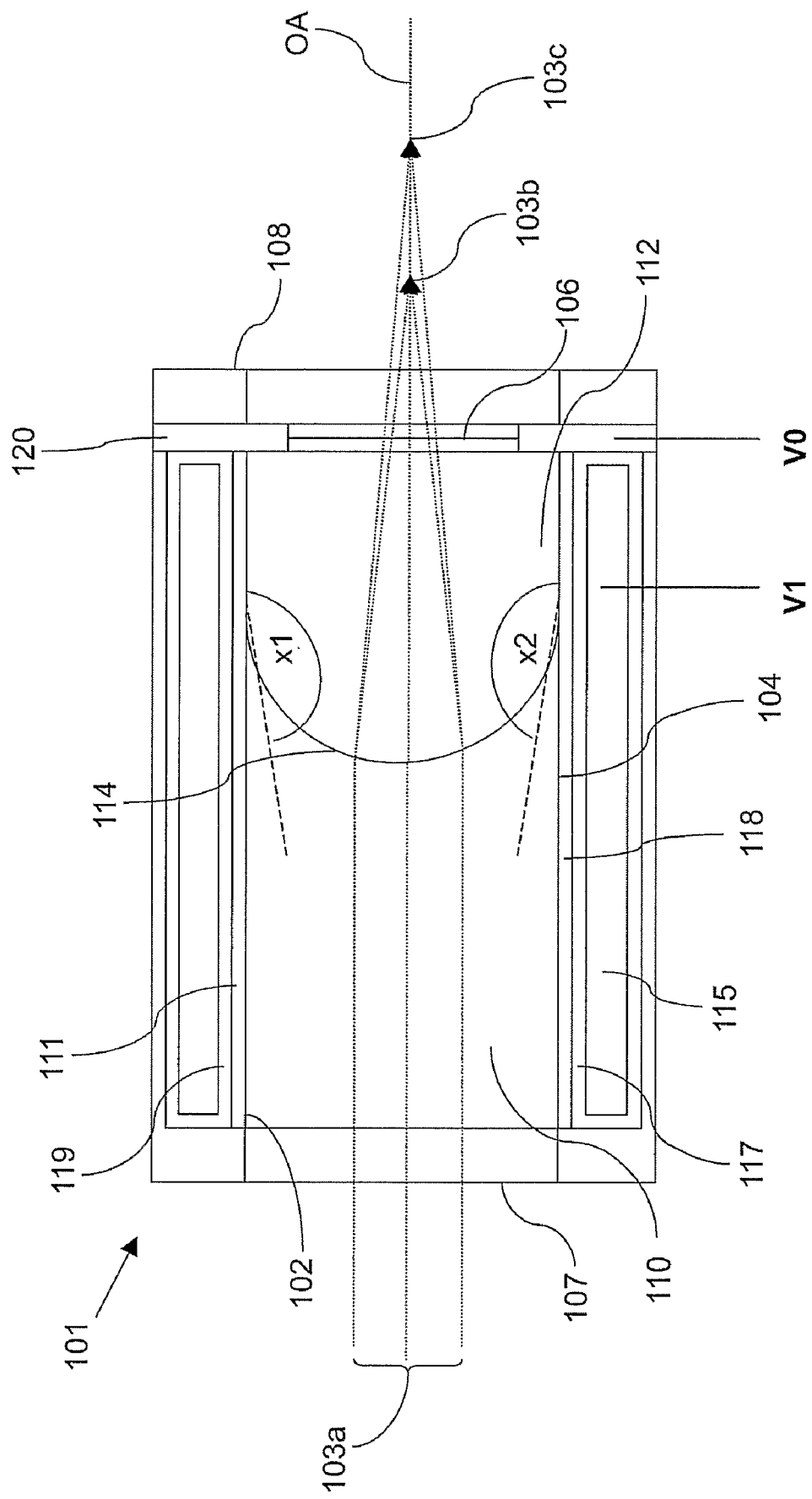
FIGS. 4a and 4b show a second embodiment of the invention, with a curved meniscus.
Figure 4B:
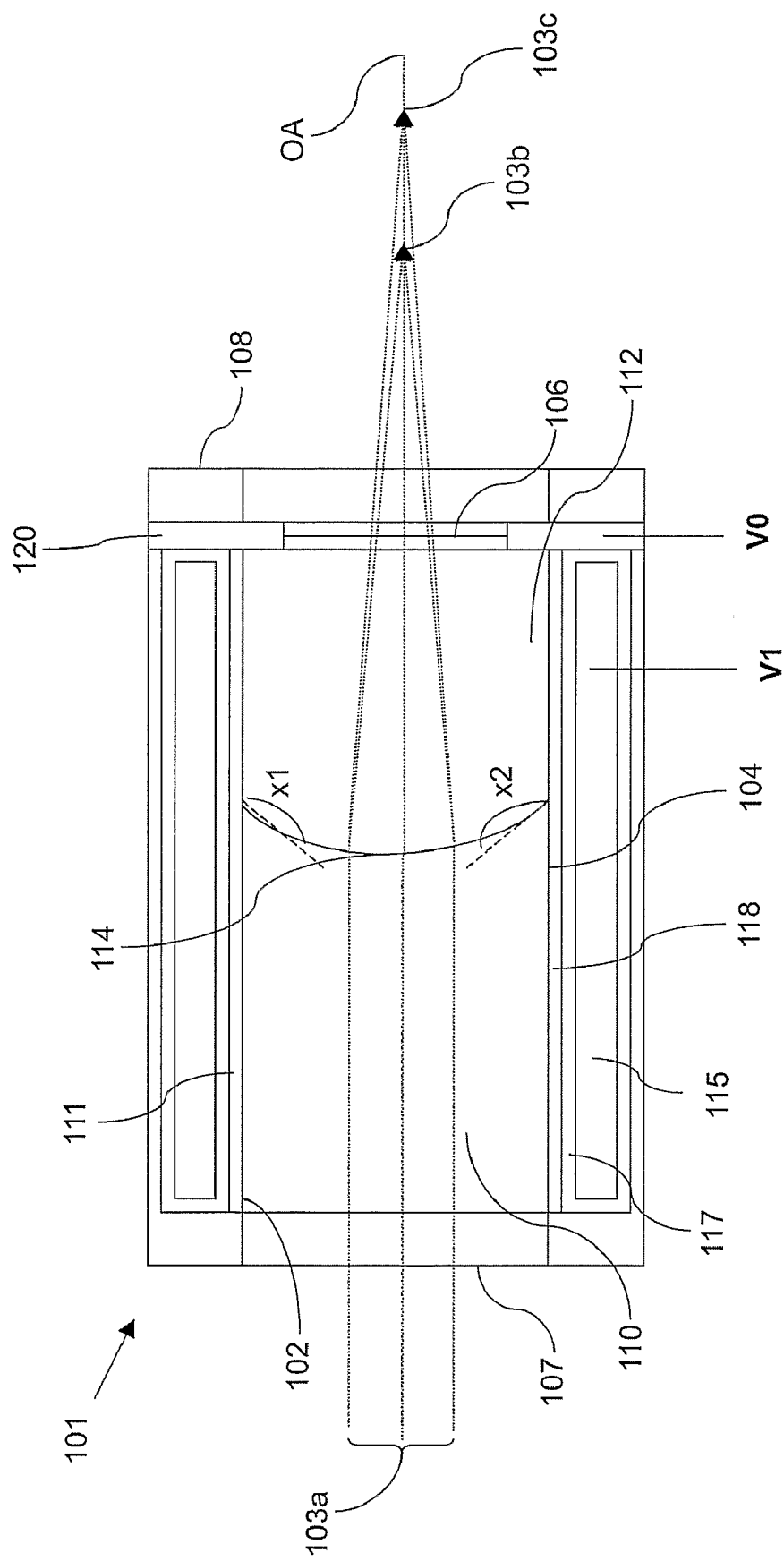

FIGS. 4a and 4b illustrate an embodiment of the invention providing a curved meniscus configuration. Elements that are similar to those described in relation to FIGS. 1, 2 and 3 are provided in FIGS. 4a and 4b incremented by 100, and the previous description should be taken to apply here. As before, the first fluid 110 is immiscible with the second fluid 112, which comprises liquid crystal molecules, aligned by alignment layer 106. A curved, rotationally symmetric meniscus is formed by providing a fluid chamber with a single sidewall electrode 115, which is preferably cylindrical, and is coated with insulating layer 117. The fluid contact layer 111, 118 is similarly preferably cylindrical. The voltage V1 of the sidewall electrode 115 being equal on all sides, the fluids 10, 12 within the optical system will act to form a variable concave or convex meniscus. When a single beam 103a is input, the shape of the meniscus 114 between the first and second fluids 110, 112, and the birefringence of the second fluid 112 results in two output beams, which are focused onto different points 103b, 103c along the optical axis OA of the system.

In FIG. 4a, a first combination of voltages V0, V1 is applied between the electrodes, and the meniscus 114 adopts a first meniscus configuration, which is concave with respect to the second fluid 112. As with the embodiment described with reference to FIGS. 1, 2 and 3, the shape and angle of the first meniscus configuration is determined by selection of the combination of voltages applied by the electrodes. In this embodiment, the contact angles x1, x2 between the meniscus 114 and the fluid contact layer 118 are always equal. In the configuration shown in FIG. 4, the contact angles are, for example, 150°.

When a second combination of voltages is applied between the electrodes, the angle of the meniscus with respect to the sidewalls is reduced, as shown in FIG. 4b. The meniscus adopts a second meniscus configuration having a decreased degree of concavity. In this second configuration, the contact angles x1, x2 between the meniscus 114 and the fluid contact layer 118, are for example, approximately 100°.

It can be seen that the points of focus 103b, 103c of the first and second output rays changes as the configuration of the meniscus is altered, due to the change in shape of the meniscus. The meniscus configuration can be very precisely controlled by means of the voltage applied between the electrodes, thereby providing a birefringent lens which is tuneable with respect to the point of focus of the output rays.

Figure 5:
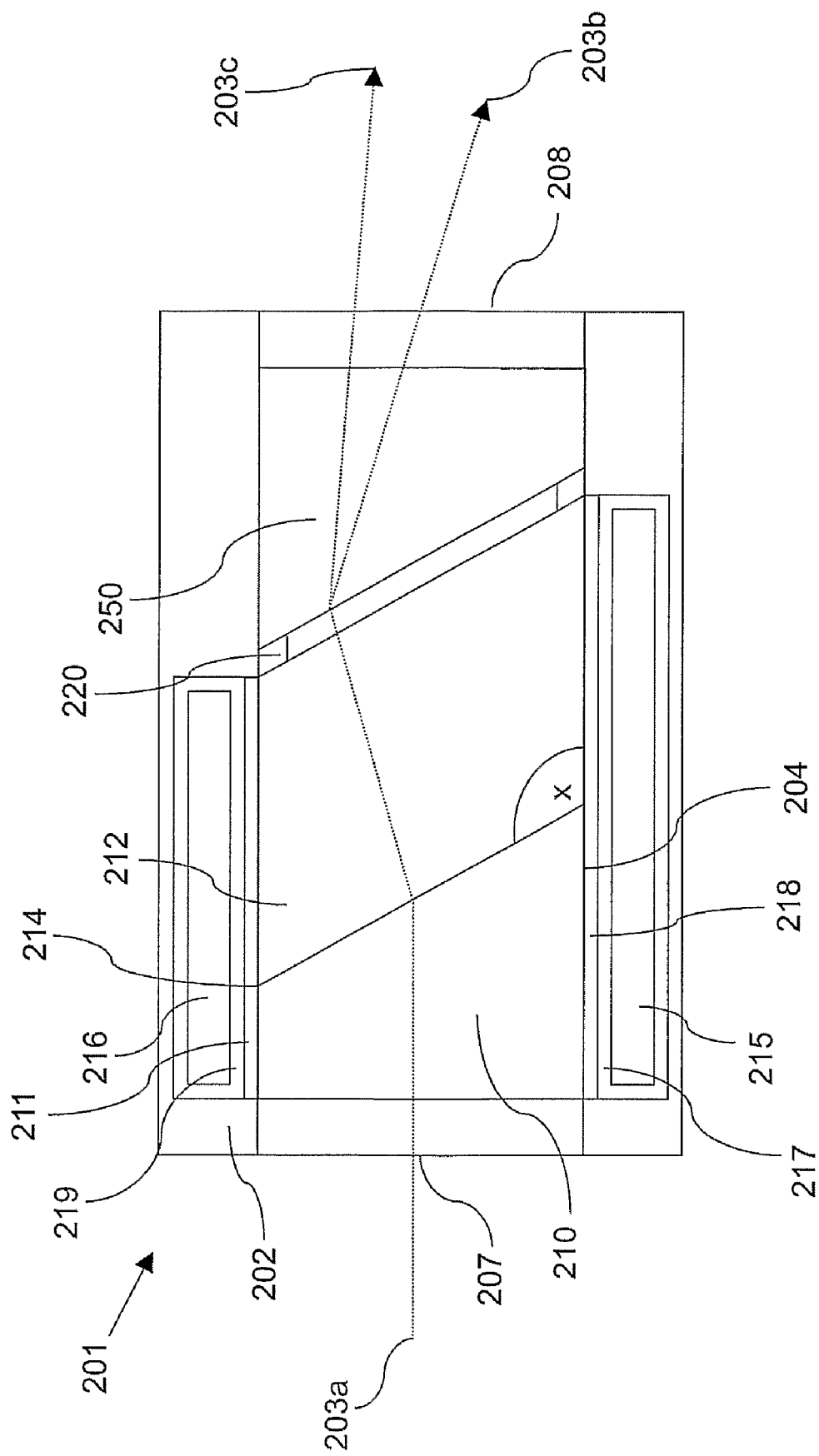
FIG. 5 shows a third embodiment of the present invention, comprising a solid birefringent part.

FIG. 5 shows a third embodiment of the invention, with a solid birefringent part. Elements that are similar to those described in relation to FIGS. 1, 2 and 3 are provided in FIG. 5 incremented by 200, and the previous description should be taken to apply here. As before, the first and second fluids 210, 212 are immiscible with respect to each other; however, the second fluid 212 is, in this embodiment, not birefringent. The fluid chamber 201 incorporates a solid birefringent part 250. The solid birefringent part may be made from any optically anisotropic solid, such as calcite. Fluid 212 is an electrically conducting liquid such as water, or a salt solution. The profile of annular contact electrode 220 is adapted to fit the angled interface of solid birefringent part 250 with the second fluid 212.

Alteration of the angle of the planar meniscus 214 alters the angle of incidence of the input beam, represented by an input ray 203a, onto the solid birefringent part 250. The contact angles x1, x2 of the meniscus are adjusted by means of the voltage applied between the electrodes in order to control the angle of incidence of input ray 203a on the interface between fluid 212 and solid birefringent part 250, as described above with reference to FIG. 1.

Figure 6:
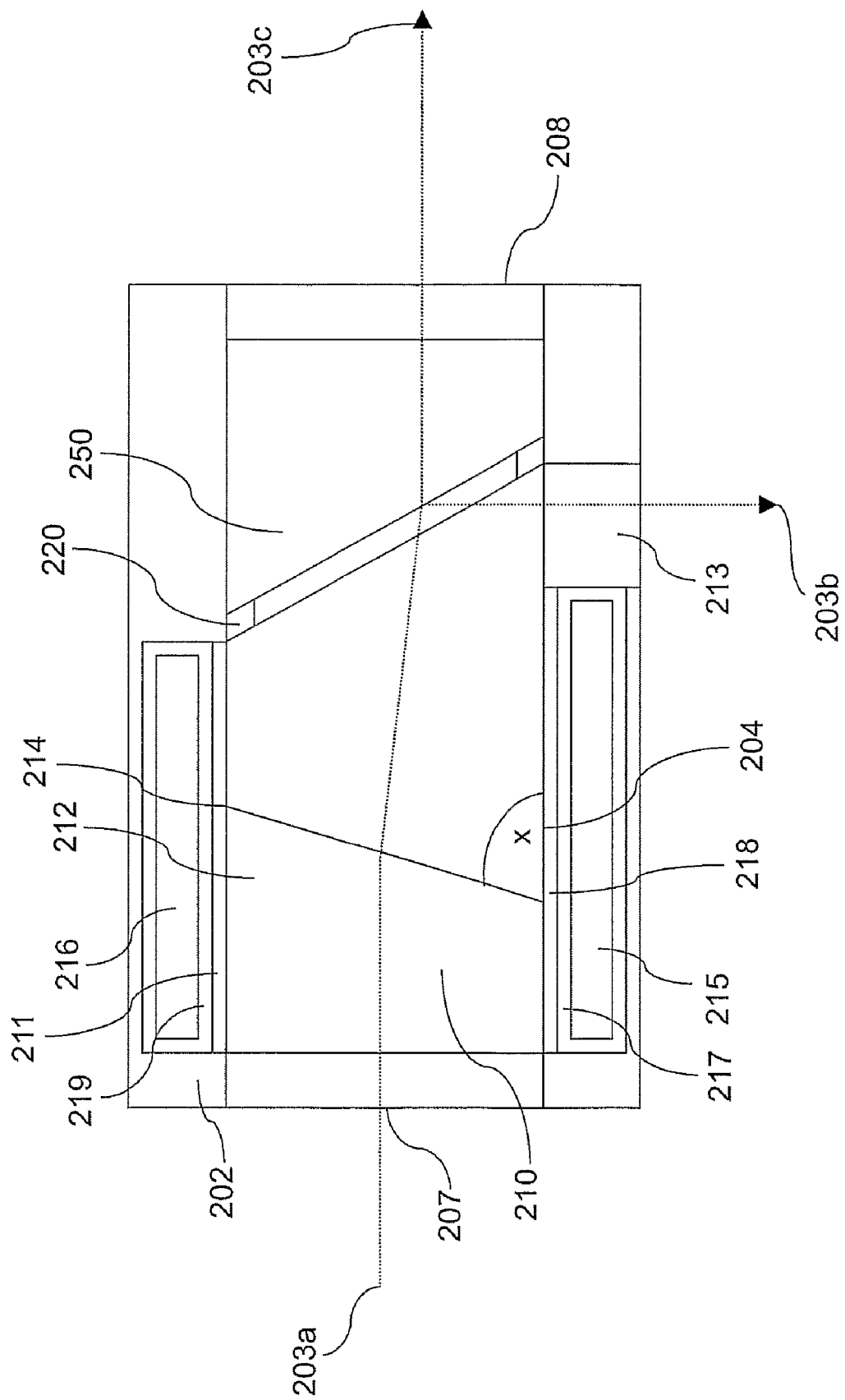
FIG. 6 shows a tuneable polarizing beamsplitter, incorporating an embodiment of the invention as shown in FIG. 5.

An embodiment of the invention can thereby provide a tuneable polarizing beam splitter, as shown in FIG. 6. Integers which are similar to those in FIG. 5 have been retained in FIG. 6, and the previous description should be taken to apply here. By varying the configuration of the meniscus 214 it is possible to vary the angle of incidence with the solid birefringent part 250 so that the first output beam, represented by ray 203b, is selectively either totally internally reflected, or refracted, at the interface between fluid 212 and solid birefringent part 250. In the case of total internal reflection, the output ray 203b is reflected back into fluid 212, and through an output window 213. The other component (ray 203c) passes through the solid birefringent part 250 and out of the fluid chamber 201 via the end wall 208. The angle of the incidence of the input ray 203a may be adjusted by altering the configuration of the meniscus 114, in order to totally internally reflect 0, 1 or 2 different polarization states. Only components of the incoming ray in polarization states that are not totally internally reflected are therefore permitted to pass through the fluid chamber out of the end wall 208.

It will be recognized, however, that the system may be arranged such that there is no internal reflection, and that this embodiment is not limited to use as a tuneable polarizing beamsplitter.

Figure 7:
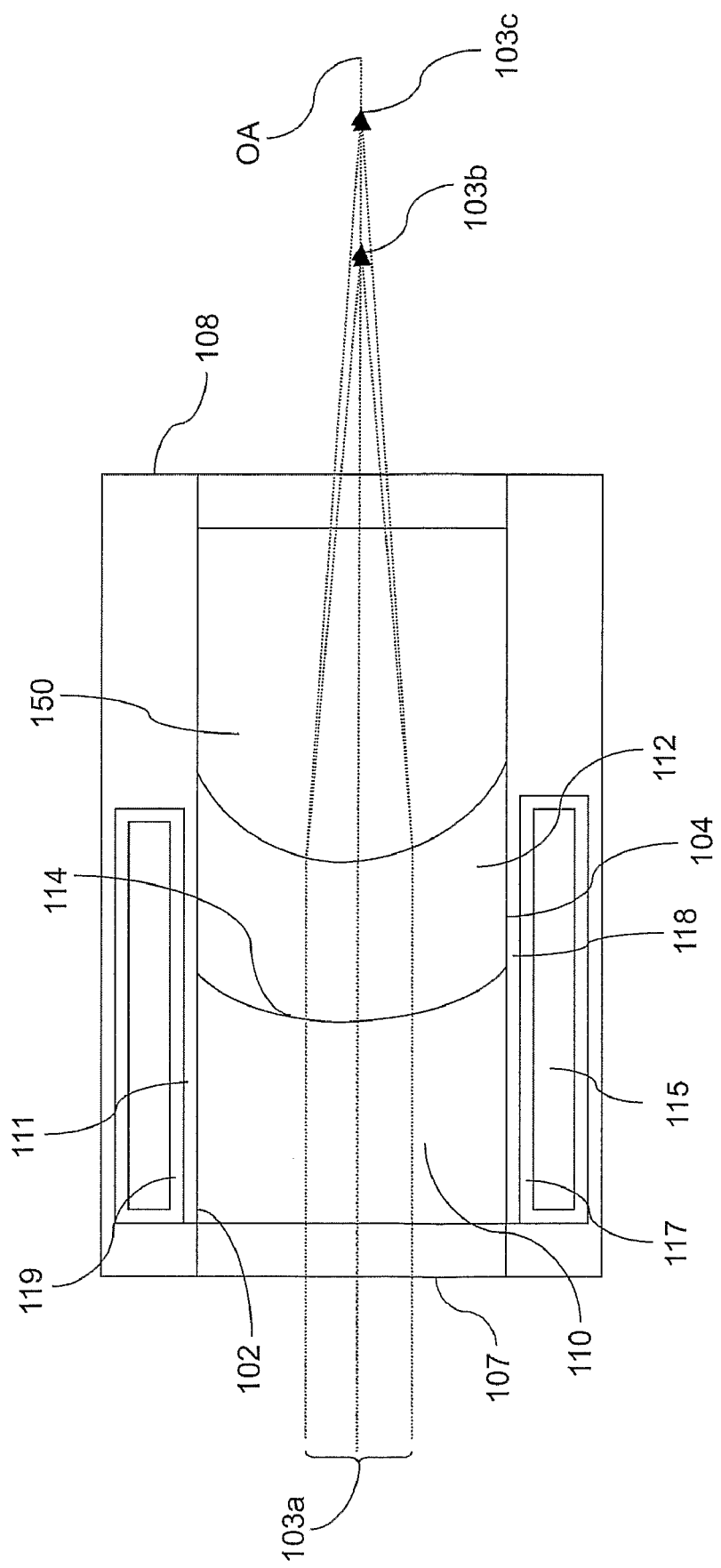
FIG. 7 shows a fourth embodiment of the invention comprising a solid birefringent part.

FIG. 7 shows a fourth embodiment of the invention incorporating a solid birefringent part, wherein the optical system is arranged such that the meniscus is curved, and the interface between the solid birefringent part and a fluid is also be arranged to be curved. Integers which are similar to those in FIGS. 4a and 4b are retained, and the previous description should be taken to apply here. A cylindrical meniscus is provided by the cylindrical arrangement of a single electrode as described with reference to FIGS. 4a and 4b. The input beam 103a is refracted by the first and second fluids 110, 112 and is further refracted at the interface between the solid birefringent part 150 and the second fluid 112, to focus on two different points 103b, 103c along the optic axis OA. The points of focus can be controlled by altering the meniscus configuration, as previously described. This alternative construction is suitable in applications where the optical properties of a solid birefringent part are required, and a curved meniscus and solid/liquid interface are necessary e.g. reading data storage layers in optical data storage media.

Figure 8:
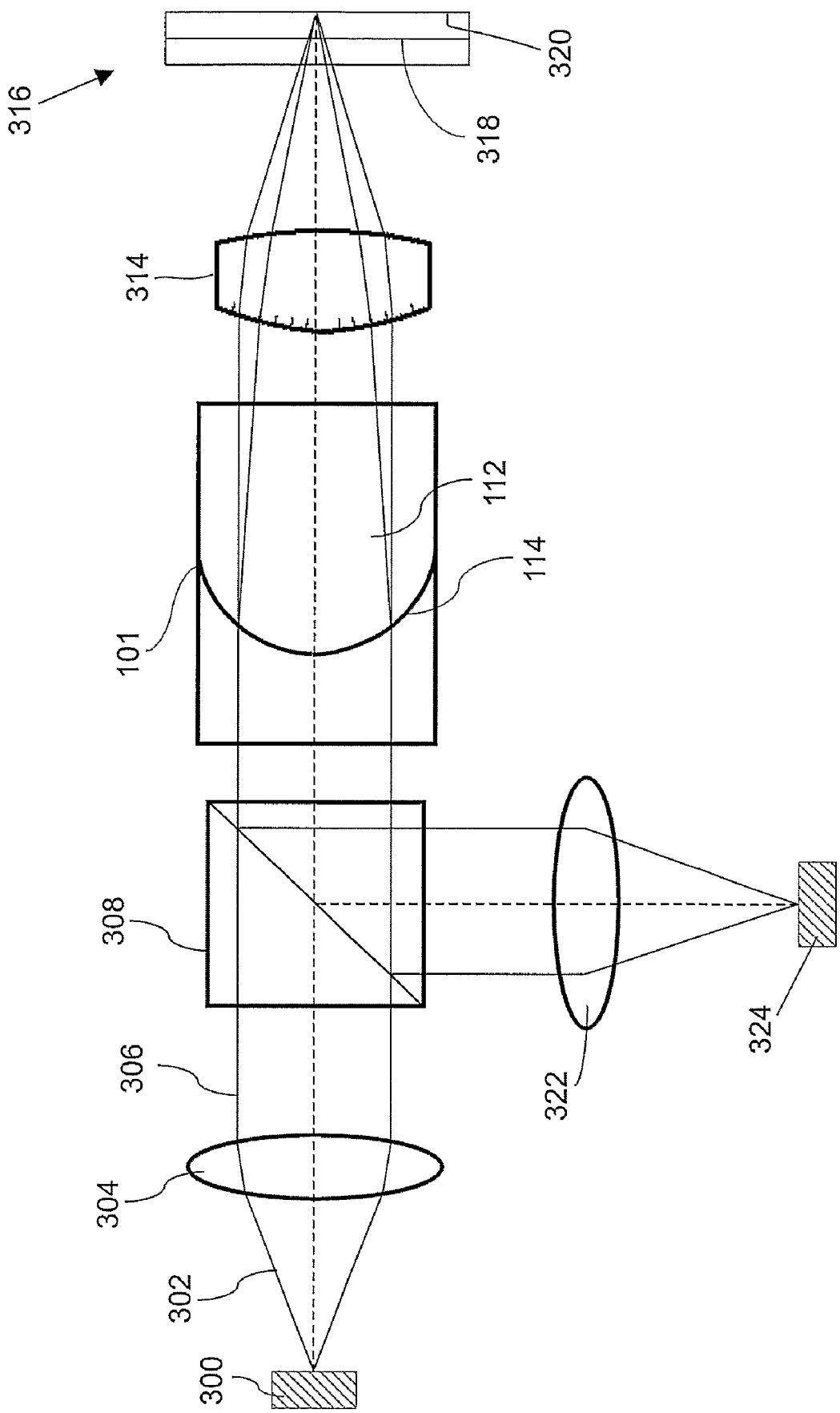
FIG. 8 shows an optical scanning device for scanning an optical record carrier, incorporating optical system according to an embodiment of the present invention.

FIG. 8 shows an optical scanning device for scanning an optical record carrier, incorporating an optical system according to an embodiment of the present invention. The embodiment of the invention described with reference to FIGS. 4a and 4b is incorporated in the scanning device illustrated. A radiation source 300 directs the scanning beam 302 through a collimator lens 304. The collimated scanning beam 306 is directed through beam splitter 308 to fluid chamber 101, as described with reference to FIGS. 4a and 4b. The collimated scanning beam passes through the fluid chamber 101 and is split, by two different indices of refraction, into two refracted scanning beams, due to the birefringence of fluid 112. The two refracted scanning beams are focussed onto two data storage layers 318, 320 in optical data carrier 316, which in this example is an optical disc. In the case of a dual layer Blu-ray™ disc, the two data storage layers are at depths of 0.1 mm and 0.07 mm, and are thus separated by 0.03 mm. The scanning beams are reflected back from the two data storage layers 318, 320 to beam splitter 308, from where the beams are directed via the collimator 322 to the detection system 324, where the data encoded in the beams by reflection from the two data storage layers 318, 320 is decoded.

The focus of the scanning beams onto the two data storage layers is adjusted by controlling the configuration of the meniscus 114 in the optical system. Variations in the structure, positioning or movement of the optical record carrier 316 will cause the data storage layers to move out of the point of focus of the scanning beams. By altering the configuration of the meniscus 114, scanning beams may be very accurately and rapidly refocused onto both data storage layers simultaneously, ensuring uninterrupted data read-out.

Figure 9:
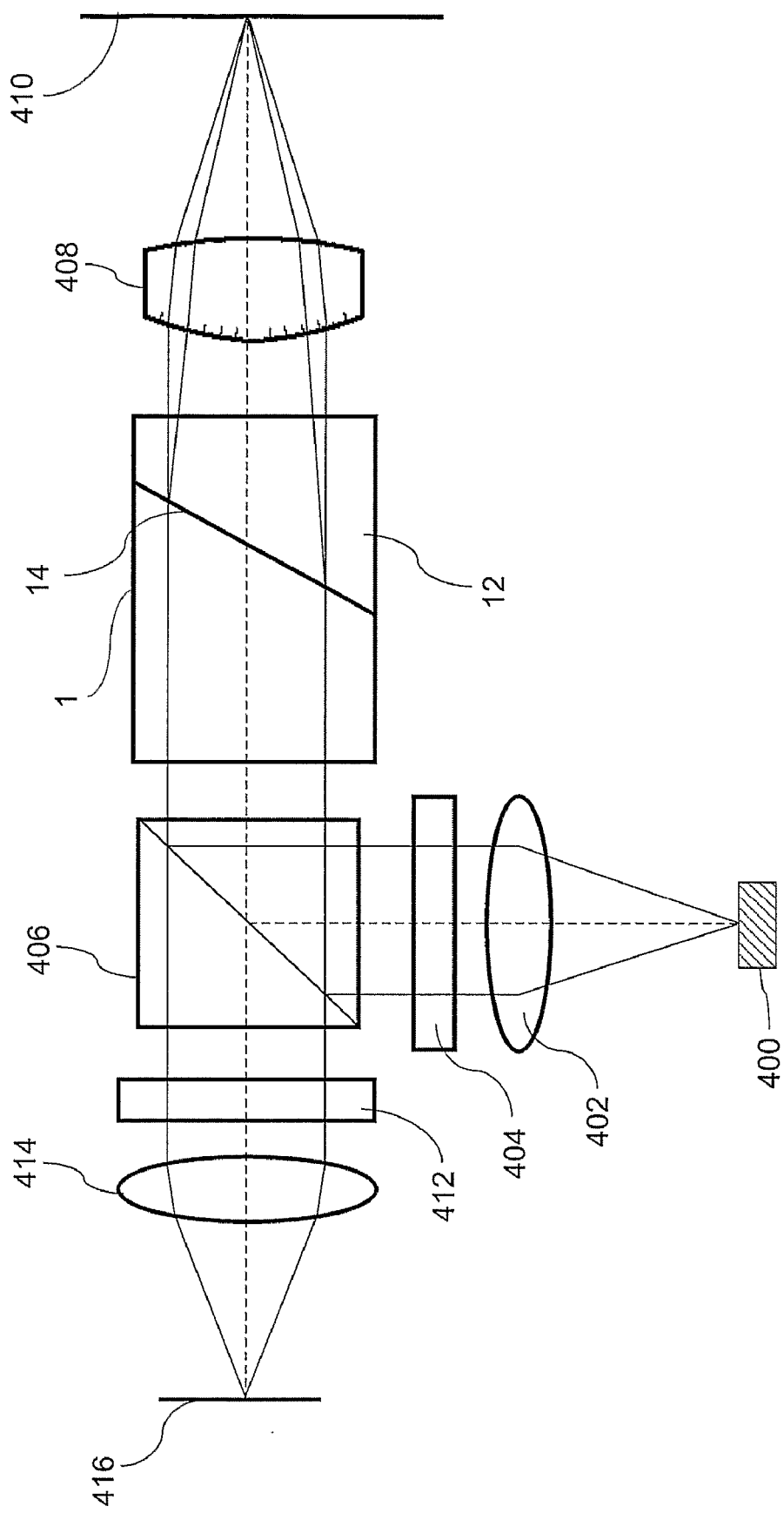
FIG. 9 shows an optical microscopy device incorporating an optical system according to an embodiment of the present invention.

FIG. 9 shows an optical microscopy device incorporating an optical system according to an embodiment of the present invention. An optical device according to an embodiment of the invention, as described with reference to FIGS. 1, 2 and 3 is incorporated into a Nomarski microscope, replacing a conventional Wollaston prism. Nomarski microscopy is a form of polarized optical microscopy that produces a colour contour map which is indicative of the three dimensional relief structure of a sample.

Light source 400 emits a radiation beam which is focused via lens 408 and is linearly polarized by polarizer 404. The radiation is split by beam splitter 406 and directed through optical system 1, as described with reference to FIGS. 1, 2 and 3. The beam is split into its two polarization components by the birefringence of second fluid 12 and directed via objective lens 408 onto sample 410. The optical system 1 creates two displaced orthogonally polarized points of focus on the sample, via objective lens 408. Radiation reflected from the sample returns via the objective lens 408, optical system 1 and the beam splitter 406, arriving at analyzer 412 with its two components of polarization relatively phase shifted. The light that passes through the analyzer 414 forms an image at the observation plane 416.

By providing an optical system according to an embodiment of the invention in place of a conventional birefringent prism, the focus of the two probing points of the ray onto the sample via the objective lens may be adjusted and tuned for optimal contrast of the image, without the need to physically shift the position of the sample or any of the other components of the microscope. The configuration of the meniscus may be very rapidly and accurately altered to optimize contrast in the image.

The meniscus may be adjusted to for the purposes of determining optimal image contrast based on signals from a user. Alternatively meniscus adjustment for the purposes of contrast may be provided by an electronic control circuit (not shown), comprising image analysis means. The image analysis means is operable to analyze the image of the sample, and the control circuit adjusts the meniscus configuration in response to the analysis by controlling the voltage between the electrodes of the optical system.

The above embodiments are to be understood as illustrative examples of the invention. Further embodiments of the invention are envisaged. For example, the configuration of the meniscus may be controlled by means other than electrowetting; for example, changes of pressure within a set of fluid chambers may be used to alter the position and shape of a meniscus, or flexible membrane.

The fluid chamber may be provided with an expansion chamber to accommodate volume changes due to the thermal expansion of the fluids, such as a flexible membrane in one of the walls of the chamber. One or both of the fluids may be a vapour, or a gas. The fluid contact layer 11, 18 and the insulating layer 17 may be formed by one, continuous layer of AF1600.

The contact electrode 20 and the first, second, third and fourth sidewall electrodes 15, 16, 22, 26 may be connected to a voltage control circuit to monitor and control voltages V0, V1, V2, V3 and V4. The voltage control circuit may then be used to rapidly alter and monitor the meniscus configuration in use. More than four sidewall electrodes may be provided, in any arrangement around the optical axis. It will be understood that various combinations of sidewall electrode arrangement and sidewall electrode voltage magnitude will enable a variety of meniscus shapes to be formed.

Where one of the fluids is a conducting fluid (e.g. in the case of the embodiment described with reference to FIG. 1, second fluid 12), the insulating layer and the contact electrode 20 form a capacitor. The capacitance can be measured using conventional means, and the configuration of the meniscus monitored and controlled with respect to the capacitance.

Furthermore, an optical system according to the invention may be implemented within an image capture device, such as a camera. An embodiment of the invention may also be used in the process of recording to an optical storage device, by writing data to data storage layers in an optical data carrier by means of radiation beams directed through the optical system.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical system comprising a fluid chamber, the fluid chamber comprising a first fluid, wherein the optical system comprises a birefringent part which is capable of varying characteristics of a first radiation beam and a second radiation beam and the first fluid comprises the birefringent part, the first and second radiation beams having different polarisations, characterised in that:
   the fluid chamber contains a second fluid, the first and second fluids having different indices of refraction and the interface between the fluids forming a meniscus; and
   the birefringent part is arranged such that a variation in the configuration of the meniscus causes said variation in the characteristics of the first radiation beam and the second radiation beam.

2. The optical system of claim 1, wherein the fluid chamber comprises a first electrode separated from the fluids by a fluid contact layer, and a contact electrode in conductive communication with or capacitively coupled to one of the fluids, wherein the fluid contact layer has a wettability by one of the fluids that varies according to a voltage between the electrodes, such that the configuration of the meniscus varies in dependence on said voltage.

3. The optical system of claim 1, wherein the first fluid comprises liquid crystal molecules, and wherein the fluid chamber comprises an alignment layer, the alignment layer being operable to align the liquid crystal molecules, wherein the alignment layer is arranged in the fluid chamber opposite the meniscus.

4. The optical system of claim 1, wherein the fluid chamber is arranged to produce a plurality of different meniscus configurations, in which the meniscus forms a substantially planar interface between the first and second fluids.

5. The optical system of claim 1, wherein the fluid chamber is arranged to produce a plurality of different meniscus configurations, in which the meniscus forms a curved interface between the first and second fluids.

6. An optical scanning device for scanning an optical record carrier, comprising an optical system according to claim 1, wherein the meniscus is configurable to correct for aberrations arising during the scanning of different information data storage layers depths in the optical record carrier.

7. An optical microscopy device comprising an optical system according to claim 1, wherein the optical system is arranged such that the first and second radiation beams are focussed onto a three dimensional sample via an objective lens to produce an output image, wherein the optical system is operable to vary the configuration of the meniscus to vary the contrast of the output image.

8. An optical system comprising a fluid chamber, the fluid chamber comprising a first fluid, wherein the optical system comprises a birefringent part which is formed from a solid material and which is capable of varying characteristics of a first radiation beam and a second radiation beam, the first and second radiation beams having different polarisations, characterised in that:
   the fluid chamber contains a second fluid, the first and second fluids having different indices of refraction and the interface between the fluids forming a meniscus;
   the birefringent part is arranged such that a variation in the configuration of the meniscus causes said variation in the characteristics of the first radiation beam and the second radiation beam; and
   the birefringent part has a refractive surface which is curved, and the fluid chamber is arranged to produce a plurality of different meniscus configurations, in which the meniscus is curved.

* * * * *